United States Patent [19]

Mark et al.

[11] Patent Number: 5,303,313
[45] Date of Patent: Apr. 12, 1994

[54] METHOD AND APPARATUS FOR COMPRESSION OF IMAGES

[75] Inventors: Peter B. Mark; Stuart M. Shieber, both of Cambridge, Mass.

[73] Assignee: Cartesian Products, Inc., Swampscott, Mass.

[21] Appl. No.: 808,539

[22] Filed: Dec. 16, 1991

[51] Int. Cl.$^5$ .......................... G06K 9/36; G06K 9/46
[52] U.S. Cl. ....................................... 382/56; 382/30; 382/48; 358/430; 358/432
[58] Field of Search ...................... 382/56, 30, 48, 33; 358/426, 430, 432, 261.1, 261.3

[56] References Cited

U.S. PATENT DOCUMENTS

| | | | |
|---|---|---|---|
| 4,091,424 | 5/1978 | Widergren | 358/260 |
| 4,288,782 | 9/1981 | Bader et al. | 340/146.3 |
| 4,410,916 | 10/1983 | Pratt et al. | 358/263 |
| 4,426,731 | 1/1984 | Edlund et al. | 382/56 |
| 4,463,386 | 7/1984 | Goddard et al. | 358/261 |
| 4,499,499 | 2/1985 | Brickman et al. | 358/263 |
| 4,606,069 | 8/1986 | Johnsen | 382/56 |
| 4,628,534 | 12/1986 | Marshall | 382/48 |
| 4,773,098 | 9/1988 | Scott | 382/21 |
| 4,887,304 | 12/1989 | Terzian | 382/30 |
| 5,109,432 | 4/1992 | Hori et al. | 382/30 |
| 5,121,444 | 6/1992 | Takizawa et al. | 382/34 |

OTHER PUBLICATIONS

"A Means for Achieving a High Degree of Compaction on Scan-Digitized Printed Text," R. N. Ascher and George Nagy, IEEE Transactions on Computers, C23 Nov. 1974, pp. 1174-1179.

"Combined Symbol Matching Facsimile Data Compression System," William K. Pratt et al., Proceedings of the IEEE, 68, Jul. 1980, pp. 786-796.

*The Bell System Technical Journal*, v. 62, No. 8, Oct. 1983. "Coding of Two-Level Pictures by Pattern Matching and Substitution." Cash, G. I.; Johnsen, O.; Segen, J. pp. 2513-2545.

*Textual Image Compression*, Research Report 91/450/34, Nov. 1991. "Textual Image Compression (Extended Abstract)." Bell, Timothy C.; Harrison, Mary-Ellen; James, Mark L.; Moffat, Alistair; Witten, Ian H. pp. 1-10.

*Pattern Recognition: 4th International Conference*, Mar. 28-30, 1988. "Lecture Notes in Computer Science." Ed. Goos, G; Hartmanis, J.; Kittler, J. Cambridge, U.K., pp. 230-239.

Primary Examiner—Joseph Mancuso
Assistant Examiner—Jon C. Chang
Attorney, Agent, or Firm—Choate, Hall & Stewart

[57] ABSTRACT

An image compression method based on symbol matching is disclosed. Precompression of the image is performed prior to symbol matching to improve efficiency. A voting scheme is used in conjunction with a plurality of novel similarity tests to improve symbol matching accuracy. A template composition scheme achieves image enhancement. Other disclosed features provide further advantages. Apparatus for implementing the image compression method for image transmission, storage, and enhancement are included.

92 Claims, 5 Drawing Sheets

Skew in the scanning process can make
characters appear as if they are on the
same line when they are not.
Skew in the scanning process can make
characters appear as if they are on the
same line when they are not.

*FIG. 11* characters appear
same line when th

*FIG. 12*

METHOD AND APPARATUS FOR COMPRESSION OF IMAGES

BACKGROUND OF THE INVENTION

This invention relates to compression of images, in particular, to compression methods employing symbol matching.

A standard 8.5 by 11 inch page, when scanned as a binary image at 300 dots per inch (DPI), comprises over 8,000,000 bits of information-about a megabyte. The same page, when scanned at 200 DPI, the scan rate of fax fine mode, comprises almost half a megabyte of information. Because of the large capacity needed to store such images, some sort of image compression is typically implemented in image storage and transmission devices.

One current standard method for binary image compression, in widespread use as the standard for facsimile transmission, is the CCITT-3 standard. This is a lossless binary image compression algorithm based on Huffman encoding of a run-length encoding of the image. The CCITT-3 standard typically compresses an image by an order of magnitude by taking into account first-order statistical regularities in the lengths of runs. Thus, a 300 DPI image may be compressed from a megabyte to 100 kilobytes.

Symbol matching can be used to increase compression ratios for binary images which consist primarily of machine-printed text. Such text is characterized by many small regions of connected black pixels, representing characters, surrounded by white pixels. A typical document might use only a few hundred different characters representing the letters of the alphabet in upper- and lowercase in a few different type faces (e.g., Times and Helvetica) and type styles (e.g., plain, bold, italics). In compression techniques employing symbol matching, similar characters are grouped, and their description as an array of black pixels is represented only once as a template. The entire binary image is represented as a sequence of templates along with references to their positions within the image. In this way, the representation contains far fewer bits than the original image. The amount of compression that can be achieved using symbol matching depends on how many characters are matched, how the templates are represented, and how the character positions are represented.

Unfortunately, characters that appear similar to the human eye are not usually pixel-identical. The printing method, subsequent photocopying, and, most importantly, the scanning process itself introduce error into the original image. An example is illustrated in FIG. 1, which depicts two instances of the letter "b" in 12 point Courier scanned at 200 DPI. The error pixels are also shown. In order for a symbol matching scheme to significantly contribute to binary image compression, error between two characters must be allowed, but bounded. Some notion of the matching of two characters based on perceptual similarity is needed for this purpose. Furthermore, since the matching characters are not all identical, a way of defining a template from the matching characters is required. Since such a template is necessarily not identical to all of the characters used to define it, the representation by templates does not encode the image perfectly. But since the characters vary only slightly in appearance from the template, the difference is not perceptible.

The success of symbol matching in binary image compression hinges crucially on how similarity of two characters is judged (how characters are matched). A matching metric allowing large pixel differences between characters is prone to substitution errors. For example, as illustrated in FIG. 2, an instance of a "b" and an instance of an "h" in the same font and size can have a relatively small pixel error. If they are matched, the reconstructed image will be riddled with errors. On the other hand, if the matching metric is too stringent, then multiple instances of the same character will not be matched and little compression will be achieved.

The use of symbol matching in binary image compression dates back to at least 1974 (see "A means for achieving a high degree of compaction on scan-digitized-printed text," by R. N. Ascher and G. Nagy, in *IEEE Transactions on Computers*, 23(11):1174-1179, Nov. 1974). Since then, a variety of compression systems employing symbol matching have been proposed. (See "Combined symbol matching facsimile data compression system," by W. K. Pratt et al., in *Proceedings of the IEEE*, 68(7):786-796, July 1980, and U.S. Pat. Nos. 4,091,424, 4,288,782, 4,410,916, 4,463,386, 4,499,499, and 4,606,069.) The present invention is a compression method employing a substantially improved matching process, as well as other improved features which increase the compression ratio.

SUMMARY OF THE INVENTION

In general, the invention includes a variety of improved features for methods for compressing images which include the basic steps of identifying symbols in the image, associating with each identified symbol an indication of its location in the image, comparing each identified symbol to templates from a library of templates to match each identified symbol to a template, and generating a compressed representation of the image including a representation of each template, and a reference to a location and to a template for each symbol in the image. The images will typically start as binary pixel-array images, but the methods of the invention are also suitable for compressing images originating in other formats.

In one aspect, the invention features, as a first step, precompressing the image. For example, for images that start as binary pixel-array images, run-length encoding may be used. When run-length encoding is used in the precompression step, the symbols may be identified by associating runs of black pixels in adjacent rows which have at least one black pixel in the same column or in the same or adjacent columns.

In another aspect, the invention features generating the library from scratch during image compression by storing in the library each symbol for which no matching template is found as a new template, and defining each template by a representation determined by a plurality of the symbols which match it. For images that start as binary pixel-array images, each template may be defined by a unique spatial distribution of black pixels determined by the distributions of black pixels of a plurality of the symbols which match the template. The distribution may be determined, for example, by averaging the distributions of black pixels of the symbols or from starting with one symbol which matches the template and changing a pixel in this symbol only if a predetermined fraction of the pixels in the same location in the other symbols matching the template disagree with it.

In another aspect, the comparing step features identifying error locations, performing a plurality of tests on the error locations and on other global features of the symbol and the template, and declaring a match between a symbol and a template only if all of at least one of a set of predetermined groups of tests are passed. For images that start as binary pixel-array images, the error locations may be error pixel locations which have a black pixel in only the symbol or the template, but not both. The error pixel locations may be run-length encoded. One appropriate test is if the distance between each error pixel location and the nearest black pixel in the template or symbol having a white pixel at the error pixel location is less than a predetermined value. Another test is if all contiguous groups of error pixel locations are smaller than predetermined sizes and shapes. Yet another test is if the difference in heights between a template and a symbol is less than a predetermined value, and similarly for the difference in widths. Yet another test is if the ratio of the number of black pixels in the symbol to the number of black pixels in the template is within a predetermined range. Yet another test is if the ratio of the number of error pixel locations to the minimum of the number of black pixels in the template and the number of black pixels in the symbol is less than a predetermined value. Yet another test is if the ratio of the number of error pixel locations to the number of black pixels adjacent to a white pixel in the template is less than a predetermined value. Yet another test is if all pieces of evidence for a shift of the symbol relative to the template are consistent, where evidence is given by local configurations of error pixels and their adjacent pixels. A novel feature of this invention is the use of tests (such as the above) based on the sizes, shapes, and orientations of local configurations of error pixels.

In another aspect, the invention features representing each template by the boundary of the spatial distibution of black pixels for the template. In a related aspect, the representation of each template includes a reference to a frame template for defining an outer boundary of the template and a list of hole templates with associated positions within the frame template for defining any inner boundaries of the template. The frame templates and hole templates may be represented by representations of the boundary of the frame templates and hole templates.

In another aspect, the invention features indexing the templates in the library according to template features. The step of comparing proceeds according to the index. In this way, those templates more likely, based on features, to match a symbol are compared to the symbol before templates less likely to match and templates whose features preclude a match are not considered.

In another aspect, the invention features reducing the resolution of the template representations to achieve further compression.

In preferred embodiments, the compressed representation of the image includes a template stream, a template reference stream, and row and column position streams. Other divisions of the information into data streams are possible. Preferably at least one of these streams is further compressed.

In preferred embodiments, any template including a region smaller than a predetermined size between two regions larger than another predetermined size is split into more than one template. Further, each template formed by a split is preferably compared to other templates and merged with any other template it matches. In preferred embodiments, symbols smaller than a predetermined size are eliminated. In preferred embodiments, the reference to a location for each symbol in the binary image is represented by the difference between the actual offset between the given symbol and a preceding symbol and a standard offset for the symbol pair defined by the given symbol and the preceding symbol. The standard offset may be the offset last seen for the symbol pair or the most frequently seen offset for the symbol pair. The difference between the standard offset and the actual offset may be determined at a lower resolution than the resolution of the binary image. In preferred embodiments, an approximation of the reading order of the symbols is determined and the compressed representation of the binary image is generated according to the reading order. The reading order may be determined by locating symbols on a single line and sorting the symbols. The symbols occupying a line may be determined by using a beam to search along the line, the size of the beam varying according to the sizes of one or more of the adjacent symbols. Vertical bounds on the size of the beam may be imposed.

In another aspect, the invention is an image transmission system (such as a facsimile system), an image enhancement system, or an image storage system operating according to the image compression methods described above.

Compression according to the invention can achieve, for example, compression ratios greater than 25 times that of CCITT-3 for an 8-page 300 DPI document. Each page is thus compressed from a megabyte of raw image to 4 kilobytes by the method of the invention. It is important to note that the compression ratio will increase with the length of the document since a single template library is used throughout. Thus, the invention has particular advantages for image transmission or storage systems dealing with large binary images.

BRIEF DESCRIPTION OF THE DRAWING

FIG. 11 is a diagram illustrating how a skew in the scanning process can make symbols appear on the same line even when they are not.

FIG. 12 is a diagram demonstrating a method for using a beam to scan for symbols in the same line to the left or right of a current symbol.

DESCRIPTION OF THE PREFERRED EMBODIMENT

Figure 1:
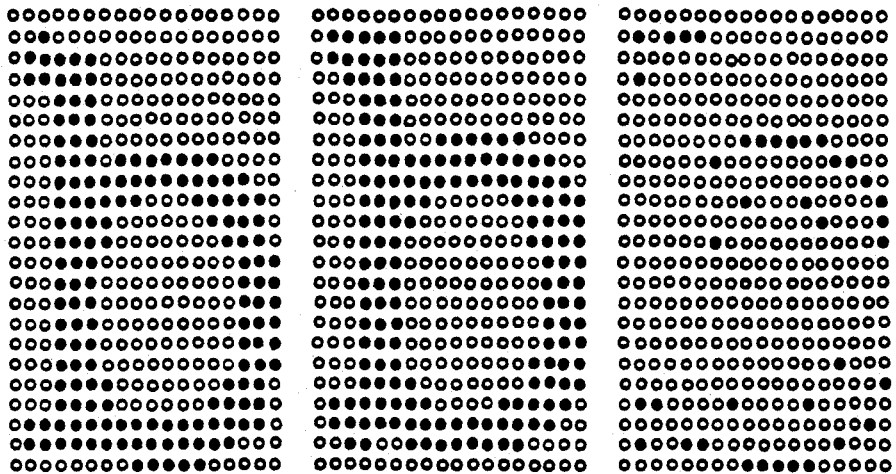
FIG. 1 is a diagram illustrating how two similar characters may not be pixel-identical.
Figure 2:
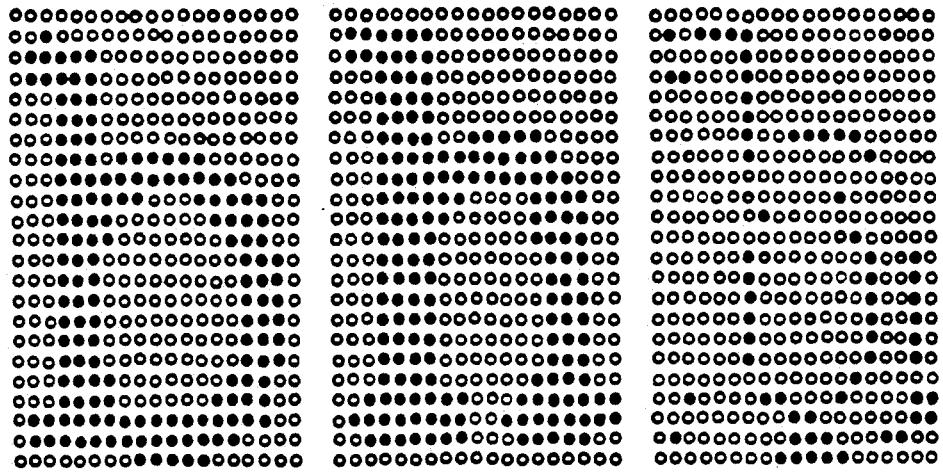
FIG. 2 is a diagram illustrating how two distinct characters may have only small pixel differences.
Figure 3:
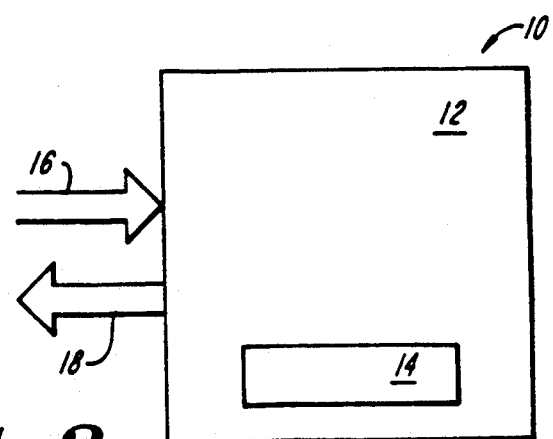
FIG. 3 is a block diagram of an image storage system employing image compression according to the method of the invention.

A system for image storage using the compression method of the invention is illustrated in FIG. 3. A processor 12 with storage memory 14 forms the heart of the system 10. As shown, the processor 12 includes at least one interface 16 for accepting representations of images. This input interface 16 may be, for example, a connection to a computer which generates images, or a connection to a scanning device used to capture a representation of an image from a hardcopy of the image. The processor 12 performs the steps of the image compression method of the invention, discussed further below. The compressed images are stored in the storage memory 14. The processor 12 also decompresses the stored images and provides reconstructed representations to at least one interface 18. The output interface 18 may be, for example, a connection to a computer used to process and/or display the image, or a connection to a printer for providing a hardcopy of the image. Preferably, the output interface 18 can display both images received directly from the input interface 16 and reconstructed images called up from storage memory 14. For reasons discussed below, the storage system illustrated in FIG. 3 can also be considered an image enhancement system when the image compression system of the invention is embodied in processor 12.

Figure 4:
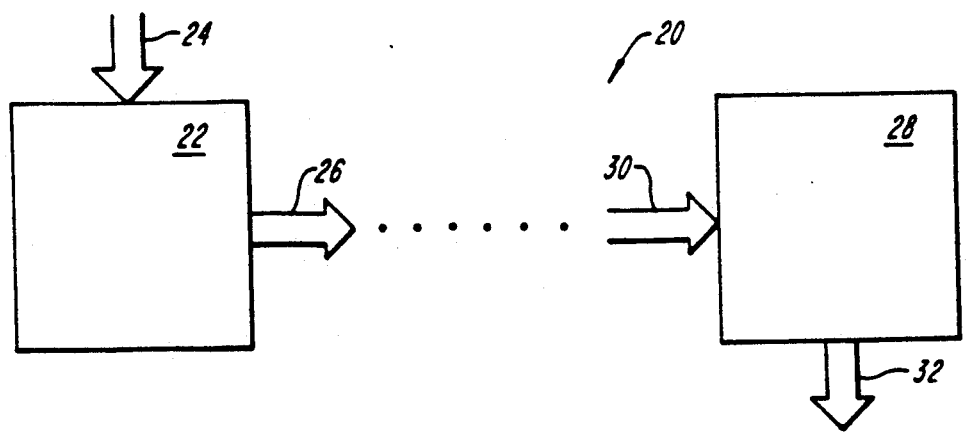
FIG. 4 is a block diagram of an image transmission system employing image compression according to the method of the invention.

A system for image transmission using the compression method of the invention is illustrated in FIG. 4. A typical example of an image transmission system is a conventional facsimile transmission system. At the transmitting end, the system 20 includes a processor 22 with memory which accepts representations of images via at least one interface 24. In a facsimile system, the input interface 24 is typically a connection to a scanning device used to capture a representation of an image from a hardcopy of the image. The processor 22 compresses the input image according to the method of the invention, discussed further below. The processor 22 further includes an interface 26 for transmitting the compressed image. In a facsimile system, the output interface 26 is typically a connection to a telephone line via a modem. At the receiving end, another processor 28 with memory includes an interface 30 for accepting the transmitted compressed representation of the image. In a facsimile system, the input interface 30 is again typically a connection to a telephone line. The processor 28 decompresses the input compressed image according to the method of the invention, and provides a reconstructed representation of the image to at least one interface 32. In a facsimile system, the output interface 32 is typically a connection to a printer.

An image compression system according to the invention accepts a representation of an image and segments the image into symbols. These symbols may represent characters (e.g., letters, numbers, etc.) or graphics (e.g., logos, charts, etc.) Each identified symbol is matched against a library of templates. In the preferred embodiment, the template library is generated from scratch as new symbols are identified. Each identified symbol is matched against templates created so far, and it is added to a matching template group if one exists. If it matches none of them, it forms a new template group and serves as the template for that group so that later symbols can be matched to it. Once all of the symbols are grouped into template groups, a representation of each template is composed, preferably based on features of many, if not all, of the members of the template group. Also, a representation of the location (typically by row and column) of each symbol in the image and the symbol's template group is built. Thus, typically four streams of information—a template stream, a template code stream, a row position stream, and a column position stream—constitute the compressed representation of the image. Other divisions of the information into streams is also possible. The streams of information are each preferably further compressed.

Decompression of an image compressed according to the methods of the invention is straightforward. First, the streams of data are decompressed if they were further compressed as a final step of the compression process. Then the template library is read from the template stream. Next, as the template code stream is read, the symbol position for each symbol in the template code stream is determined from the row and column positions streams, and a representation of the template is overlayed at the determined position.

Figure 5:
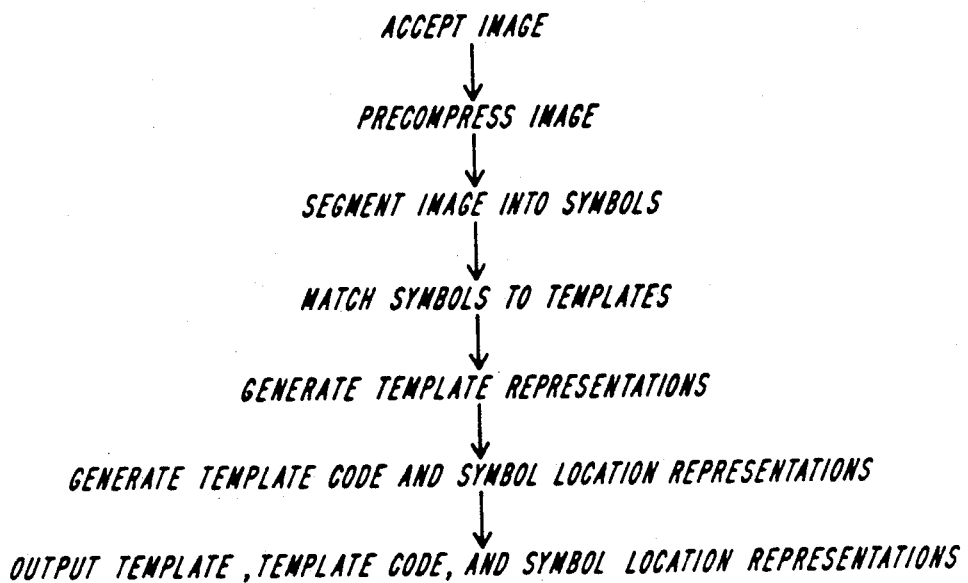
FIG. 5 is a flow chart summarizing the steps performed by an image compression system according to the invention.

A flowchart of the steps for image compression according to the preferred embodiment of the invention is provided in FIG. 5. The steps of the method will now be taken up in turn.

Precompression of the Image

In typical implementations of image compression systems, images are provided as binary pixel arrays, with connected regions of black pixels representing characters, graphics, etc. The pixel array may be provided, for example, by a computer storing the image in such a form, or by a scanning device which converts a hardcopy of a binary image into a pixel array.

Prior binary image compression systems, such as those referenced above, operate directly on the pixel array. For a 300 DPI, 8.5 by 11 inch binary image, a megabyte of memory is required to store the pixel array, and millions of operations may be required to scan this memory. To reduce this burden, according to the invention, the pixel array is precompressed before the symbol matching process is commenced. This saves significant amounts of storage space as well as valuable processing time. The step of precompression makes the entire compression process more efficient in space and time, an important advantage for commercial products.

A standard technique for compressing a pixel array representation of a binary image is to run-length encode it. This turns out to be a very suitable way to precompress a pixel array for the purposes of the invention. A technique for segmenting a run-length encoded representation of a binary image into symbols is presented in the next section.

Variants of run-length encoding may be used to precompress the binary image. For example, a pixel array representation may be compressed to a y-axis representation. According to this technique, each non-empty row in the image (of constant y, hence the name) is encoded as a list containing, in order, the row index, and the indices of the first x coordinate at which a black pixel region is encountered, the x coordinate at which the region is exited, the second x coordinate at which a black pixel region is entered, the x coordinate at which the region is exited, and so forth. This representation can be efficiently generated by a raster scanning process, and is quite convenient for further compression by symbol matching. It has the advantage of being a very compact representation for images with a lot of white space occurring in horizontal bands, e.g., non-skewed images of double-spaced text. (For further information on y-axis representations, see "Representations of contours and regions for efficient computer search," by R. D. Merrill, in Communications of the *ACM*, 16(2):69–82, February 1973.) Hereinbelow, the term "run-length encoding" will refer to any variant of run-length encoding.

Other precompression techniques are also appropriate. One such technique involves representing a pixel array as a quadtree. A quadtree encodes binary images hierarchically. A square image is divided into four subregions corresponding to the northwest, northeast, southwest, and southeast quadrants. If all of the pixels in a quadrant are black, the corresponding tree node is recorded as black; if all pixels are white, the node is recorded as white. Only if the quadrant contains both black and white pixels is further subdivision necessary. In this case, the quadrant is recorded as gray, and is further subdivided recursively. This representation is space-efficient for images with large continuous areas of black or white, such as text images. (For further information on quadtrees, see "The quadtree and related hierarchical data structures," by H. Samet, in *Computer Surveys*, 16:187–260, 1984.)

Yet another compression technique involves the use of chain codes to efficiently represent boundaries. A binary image can be represented as a set of chain codes for each black pixel region in the image. The chain code for a region consists of a starting point and a specification of a series of unit moves along the 4 or 8 compass directions that trace out the border. First derivative of direction can be used to further compress the representation for sufficiently smooth regions. Since the chain code representation picks out connected regions, it is especially appropriate as an image representation on which to perform symbol matching. The chain code representation can be used to calculate the area of a region, a procedure which is important in symbol matching. Furthermore, chain code representations of regions are particularly efficient for merging. Thus, a mixed grid file (see below) and chain code initial representation can be efficiently converted to a pure chain code representation. (For further information on chain codes, see "Computer processing of line drawing images," by H. Freeman, in *Computer Surveys*, 6(1):57–98, March 1974.)

Grid files can be used to exploit the advantages of more than one compression system. A grid file is made by breaking the binary image into a regular or non-regular rectangular grid in x and y. Each rectangular section is then encoded by some other mechanism such as quadtrees or chain codes. The grid can be chosen so as to maximize the efficiency of the coding for different regions of the binary image. (For further information on grid files, see "The grid file: An adaptible, symmetric, multikey file structure," by J. Nievergelt et al., in *ACM Transactions on Database Systems*, 9:38–71, 1984.)

Note that the step of precompressing the binary image from a pixel array representation to a precompressed representation is not required in cases where the provider of the binary image has already performed such a compression, or where the provider of the binary image yields a compressed representation automatically (with no pixel array as an intermediate step). Furthermore, there may be cases where the binary image is provided in a representation compressed relative to a pixel array representation, but where conversion to another compressed representation would be preferable for the purposes of symbol matching. All such variants are within the scope of the invention.

Segmentation of the Image into Symbols

After the binary image is precompressed from a pixel array representation to a precompressed representation, the image is segmented into symbols. According to the invention, every connected region of black pixels is identified as a symbol. Therefore, in addition to letters and numbers, graphics such as logos and charts will also be considered symbols. This is in contrast to all prior approaches. For example, U.S. Pat. No. 4,410,916 discloses a segmenting method wherein the binary image is segmented into symbols (e.g., characters) and non-symbols (e.g., graphics).

By way of example, an efficient way of segmenting a run-length encoded representation of a binary image will be presented. The method works by associating with each black run an identifier for the character it is a part of.

In the preferred embodiment of the segmenting method, each black run in the binary image s operated on in top-to-bottom, left-to-right order. For each run the region of the previous row directly above the current run is examined, and all of the runs that overlap that region are collected. Each of these runs will have already been assigned to a symbol since they appear before the current run in the top-to-bottom order. The current run is added to the symbol associated with the leftmost such overlapping run, and all of the runs associated with the other overlapping runs are reassociated with that symbol. The reassociation can be done by a single pointer operation if the associations are appropriately represented.

Figure 6:
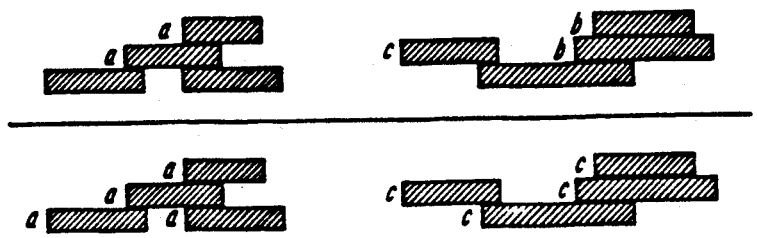
FIG. 6 is a diagram demonstrating a method of segmenting a run-length encoded binary image into symbols.

Two snapshots of the segmenting process are illustrated in FIG. 6. After segmenting two rows of an image, runs have been assigned to three different symbols (identified with the labels "a", "b", and "c"). As the runs of the third row are processed, each is given the label of a run above it. In the case of the last run, which has two runs directly above it, the label of the first such run is used. Later runs (those associated with the label "b" in this example) are reassociated with the label of the current run ("c").

Often, small groups of just a few pixels will be introduced in a binary image as a result of scanning or printing error. These characters can disrupt the compression process, particularly the final compression of the representation of template codes and corresponding symbol locations, discussed further below. According to a preferred embodiment of the invention, all symbols that are smaller than a certain threshold (four, say) are eliminated during the symbol identification process.

Symbol Matching

In prior methods of symbol matching for binary image compression, numerical results derived from one or more tests are combined in a weighted manner and the result is thresholded to determine whether or not a symbol matches a template. According to the invention, an alternate technique is employed, which has been shown to improve matching accuracy, and therefore, to reduce errors. The method of the invention is a voting scheme, where a plurality of tests are used for each symbol/template pair. Each test which is passed (indicating similarity between the symbol and template) contributes one vote to a sum of votes. In order for a match to be declared, a predetermined number of votes must be received. More generally, the tests can be grouped into one or more predetermined groups, and all tests within at least one of the groups must be passed for a match to be declared. In one embodiment, the vote must be unanimous for a match to be declared.

For most applications, a good symbol matching process for the purposes of binary image compression must take into account the error introduced by scanning. This error can be presumed to be primarily a quantization error due to a shift in registration of the characters relative to the scanning grid. Following from this, error is expected to occur only at the edges of the symbols (the juncture of black and white pixels). However, since quantization error is associated with different placements of the same symbol relative to the scanning grid, the overall number of black pixels is expected to be roughly constant for two similar symbols. Furthermore, the number of error pixels is expected to be small for two similar symbols. Finally, any evidence for the presumed shift of a character relative to the scanning grid should be consistent across the entire symbol. These observations suggest the following similarity tests for determining a match between a symbol and a template.

Edge test 1: All error pixels must be within a fixed distance $d_{edge}$ of an edge.

Edge test 2: No block of error pixels may be larger than $d_n$ by $d_n$ square.

Edge test 3: The difference in heights of the symbol and the template must be less than or equal to a fixed bound $d_{size}$, and similarly for the widths.

Density test: The ratio of the number of black pixels in the symbol to the number of black pixels in the template must be within the range $1 \pm d_{density}$.

Error test 1: The ratio of error pixels to the minimum (or, equivalently, maximum) of the number of black pixels in the template and the number of black pixels in the symbol must be less than a bound $d_{distortion}$.

Error test 2: The ratio of error pixels to black pixels occurring on an edge (i.e. adjacent to a white pixel) in the template or in the symbol must be less than a bound $d_{edge-distortion}$.

Shift test: All inferred shifts of the symbol relative to the template must be consistent.

Other tests are also possible.

Edge test 1 may be implemented, for example, by checking whether the distance between each error pixel location and the nearest black pixel in the template or symbol having a white pixel at the error pixel location is less than a predetermined value. The inverse test could also be used, that is , the distance between each error pixel location and the nearest white pixel in the template or symbol having a black pixel at the error pixel location could be checked.

Figure 7A:
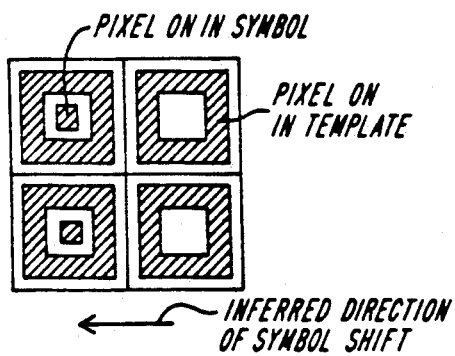
FIGS. 7A–7E are diagrams illustrating configurations of error pixels used to infer shifts for the shift test.
Figure 7B:
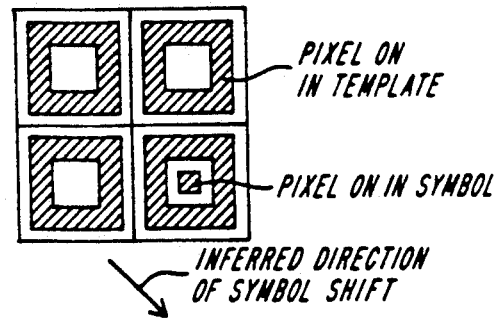
Figure 7C:
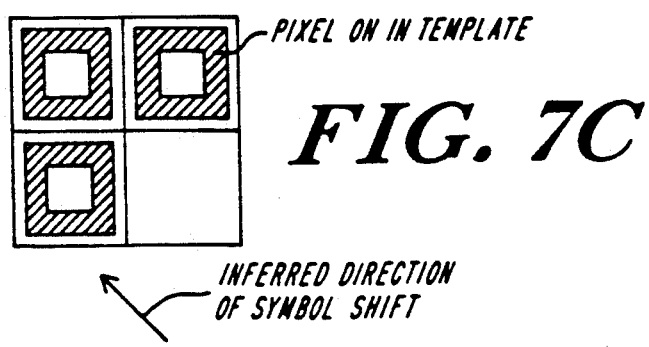
Figure 7D:
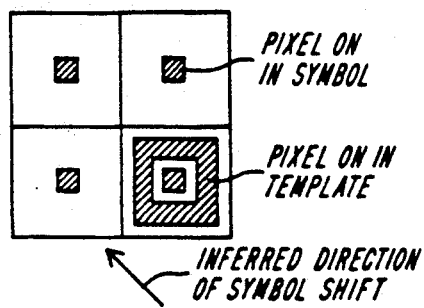
Figure 7E:
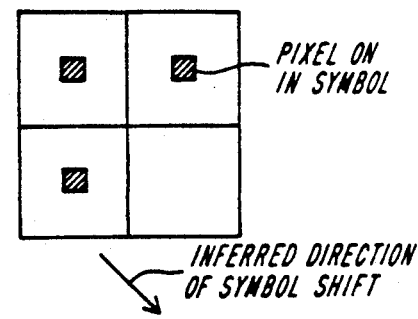

The shift test requires a method for inferring the presumed shift of the symbol relative to the template. One method for inferring shift is to examine groups of error pixels of the same source, that is, which are all black pixels in the template or all black pixels in the symbol. The overall map of error pixel locations can be divided into two separate maps of (1) error pixels that are black in the template (the template error map), and (2) error pixels that are black in the symbol (the symbol error map). Contiguous groups of pixels in these various error maps can be presumed to have arisen from a shift of the symbol relative to the template. For instance, a, vertical column of two error pixels in the template error map that are adjacent and to the right of black pixels in the template may be due to the symbol having shifted away from the error pixels toward the adjacent pixels. An example of this configuration is illustrated in FIG. 7a.

Another pattern of error pixels that can be used to infer shifts is a triangle of three contiguous error pixels of the same source. For example, if the three contiguous error pixels of such a configuration are found in the template error map, and the pixel location that falls within the two-by-two square that bounds the three error pixels is black in the template, a shift can be inferred away from the error pixels toward the adjacent pixel. If, on the other hand, the adjacent pixel is white in the template, a shift away from the adjacent pixel can be inferred. Converse inferred shifts can be inferred from such triangles of error pixels in the symbol error map. Examples of these configurations are illustrated in FIG. 7b-e.

Other sizes, shapes, and orientations of local sets of error pixels from the various error maps can be used to infer shifts for the purpose of comparing consistency of shift. The triangle-based test for inferring shifts is used in the preferred embodiment of this method.

The determination of whether all shifts are deemed consistent can be done by requiring that all of the inferred shifts are identical, or by weaker restrictions, such as requiring that a certain percentage be identical, or that no pair be in opposite directions, or that all be within a certain angular range of each other, or combinations of these tests. In the preferred embodiment, identity of all inferred shifts is required.

Note that Edge tests 1 and 2 and Shift test look specifically at local configurations of pixels in the error maps (the overall, the template, and the symbol maps). The use of categorical tests based on size, shape, orientation, and relation to adjacent pixels of local sets of error pixels is novel to this method. The particular tests described here are used in the preferred embodiment, but all such tests are included within the scope of the invention.

In order to apply these tests to a symbol/template pair, the symbol and template must be registered to each other, for example, by aligning two corners. Registrations that differ by one or more than one pixel are preferably also tested, requiring a plurality of potential registrations to be considered.

The various bounds specified in each test need not be fixed. Preferably they are varied as a function of the size of the symbols. This is because humans perceive symbol differences as being salient differentially with symbol size. In a small font, for instance, the difference of only a few percent in the number of pixels is significant, whereas at larger font sizes, that same percentage may not be perceived as significant. The ability to use different bounds at different sizes can allow more aggressive matching at larger sizes without sacrificing distinctions at the smaller sizes.

By way of example, appropriate values of the bounds for the above tests are $d_{edge}=1$, $d_n=2$, $d_{size}=2$, $d_{density}=0.50$, $d_{distortion}=0.20$ (if fewer than 150 pixels) $=0.40$ (if greater than 200 pixels) and interpolated otherwise, and $d_{edge-distortion}=0.51$.

Representation of the Templates

Figure 8:
FIG. 8 is a diagram illustrating the improvement in symbol quality that can be achieved by composition of symbols into templates.

In many prior methods of binary image compression using symbol matching, the first symbol encountered in each template group serves as the exemplar for that group. According to the invention, rather than throw away the information about the appearance of all of the other symbols that matched the first one, several or all of the symbols are used to compose the template representation. In this way, a template can be composed that appears "better" than any of the symbols from which it was formed. The reconstructed binary image can actually be an improved image because similarity among the matched characters in the binary image is providing further information about the shapes of the symbols. Unlike smoothing techniques, this method reduces high frequency error without sacrificing high frequency information in general. Because of this property, the method can be used as an image enhancement technique, as well as an image compression method. An example of the enhancement that can be expected is illustrated in FIG. 8, where a magnified image of the word "here" in its original form in a digitized image, and a magnified image of the same word in the reconstructed image, are presented. Note the improved quality of the characters, especially the character "r", which was achieved by composition of a plurality of symbols into templates.

One way this "averaging" process can be carried out is simply to keep a pixel black in the template only if the majority of symbols forming the template have that pixel black. To prevent artifacts of the averaging process, which can occur when a small number of symbols are averaged, an alternative composition method is to use the appearance of one of the symbols, the first symbol encountered, say, but to allow the other symbols to vote on changing any given pixel. The vote will succeed if more than a specified fraction, two-thirds, say, of the other symbols disagree with the original symbol. For templates composed of large numbers of symbols, the effect is much the same as averaging, but for templates with small numbers of symbols, a greater weight is given to one symbol, eliminating averaging artifacts. Other procedures for template composition are possible which achieve the advantages discussed above.

Template composition may be performed at many stages during the compression process. According to one embodiment, the "averaging" is performed as an ongoing process as symbols are matched to templates in the library of templates. In this mode, the representations of the templates in the library continually change as symbols are matched to the template groups. This can ultimately decrease the number of templates stored in the library since templates will gradually come to resemble the average features of the symbols, resulting in more frequent matches.

According to another embodiment, the "averaging" is performed only after all symbols have been placed in template groups. In this mode, the first encountered symbol (typically) of any template group is used in the matching process. The averaging that occurs at the end of the process serves to provide an improved representation of the characteristics of the symbols in the template group.

Note that in either of the above modes of operation, after the symbols have been grouped into templates, two templates may be merged if the representation of the two templates match under the above criterion. Because of the averaging effect of the template composition, two templates may match even though the symbols that were matched with the two templates did not. Template merging can further decrease the number of templates that must be represented. According to one embodiment, templates can be generated for each page individually by matching, and then the templates from the several pages merged. Different matching criteria may be used for the first matching process within the page, and the second merging process across pages.

As symbols in a binary image are processed, a library of templates is developed by augmenting an initial library with new templates as they are found. The initial library may include prestored symbols (say those of especially frequent usage in a particular application) or may be empty. If prestored symbols are employed, it may not be necessary to augment the library. Furthermore, it may not be necessary to incorporate the representations of the templates corresponding to the prestored symbols into the compressed representation of the image, since these template representations may also be prestored in the apparatus performing the decompression (which may or may not be the same as the apparatus performing the compression).

The templates are preferably stored in the library in such a way that those templates likely to match a given symbol are accessed first. In prior methods (see, for example, U.S. Pat. No. 4,606,069) templates are stored according to frequency of occurrence, so as to speed up the time taken to find a matching template. According to the invention, an alternative storing scheme is used which has been shown to result in increased speed and efficiency. In preferred embodiments, the templates are stored in a hashed structure indexed by features of pertinence to the matching process, such as height, width, number of black pixels, etc.

At least two modes of operation are possible with this indexing scheme. In one mode, a given symbol is compared to templates until either a match is found or the templates are exhausted. The templates are compared in an order determined by the indexing scheme so that those most likely to match are compared first. However, in the preferred mode of operation, the indexing scheme is used to rule out groups of templates, and the given symbol is not compared to templates whose indexed features would preclude a match.

The indexing scheme can also be used to adjust the ordering of the tests employed in the matching process to improve the speed with which matches are made.

According to another aspect of the invention, the stored representations of the templates are compressed. Compressed representation of the templates may be used throughout the matching and template composition process, or, alternatively, the templates can be compressed after these processes are complete. This is particularly advantageous in image transmission systems where the template representations are to be transmitted. Various compression techniques are appropriate. For example, the template may be CCITT-3 encoded. Or, a run-length encoded representation may be further compressed by an adaptive method such as an adaptive Huffman code or a variant of Lempel-Ziv compression.

Figure 9:
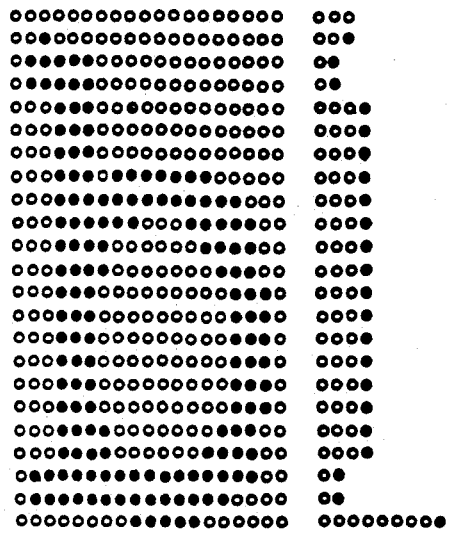
FIG. 9 is a diagram demonstrating a method of representing a symbol by tracing the edges of a pixel array image.

Alternatively, a change in representation can be used that takes advantage of the connectedness and vertical stability of typical characters. Rather than run-length encoding the pixels, the boundary of the character can be traced. FIG. 9 shows one way this tracing of edges can be performed. In this figure, the leftmost edge of a pixel array representation of the letter "b" is traced from the first black pixel in the image. Note the regular structure of the trace. Most moves are "left 0". This regularity can allow for significant further compression.

Figure 10:
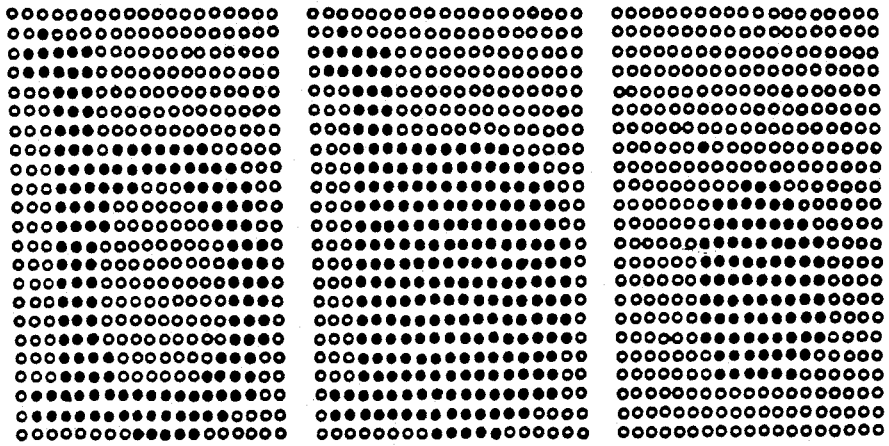
FIG. 10 is a diagram demonstrating a method of representing a symbol as a frame and at least one hole.

Furthermore, the binary image representation can be decomposed into connected regions of the same color pixels. The symbol can be decomposed into a "frame" and some "holes" in the frame by eliminating all black runs that occur between the leftmost and rightmost black runs in a single row. The removed runs, when parity inverted, constitute the holes in the frame. FIG. 10 shows a pixel array representation of the letter "b" broken up into a frame and an inverted image of the holes (in this example there are two). The latter image can itself be compressed recursively by treating it as a separate symbol and placing it in a template group. The original image of the templates can then be represented by a reference to a frame template and a list of hole templates with their associated positions in the frame. The ability to use the same hole image in several frame templates allows for further compression. Because of the recursive nature of the compression process, these holes may themselves have further holes in them, and so on. At each level, the parity of the frame and its holes inverts, white holes on a black frame, black holes on a white frame, etc.

The advantage of the frame and hole representation is that the structure of the characters is better represented, especially as concerns the shapes of their boundaries. Consequently, representing the templates by a trace of their boundaries (as described above) is even more effective.

Error in scanning or printing text can cause neighboring characters to run together. By splitting such characters into their two parts, more redundancy can be exploited in compression, because the two parts may match with other characters, whereas the run-together pair is unlikely to. The splitting of run-together characters could be performed during the symbol identification step of the process whenever a single vertical run of a few (two, say) pixels connects the two halves of a symbol. However, according to a preferred embodiment of the invention, the splitting is per-formed on the templates after all symbols have been matched into template groups. After a template has been split into one or more components, each component is preferably compared to the other templates and merged with a matching template if one is found. Since templates preferably represent the "average" features of the symbols in the group, the run-together error will usually be averaged out. Thus, the reconstructed image will actually be improved by the reduction of run-together characters.

To avoid splitting templates that happen to have such a "bridge" in them, the two halves are preferably required to be of a sufficient size. In particular, each half can be required to be of at least a certain height. Also, one might require that one or both of the halves match an existing template. Note that the bridge is preferably not deleted (although it may be averaged out in the template representation). Thus, even if symbols which actually have such a bridge are split, the bridge will appear when the image is reconstructed.

REPRESENTATION OF THE TEMPLATE CODES AND SYMBOL LOCATIONS

In order to allow reconstruction of a binary image compressed according to the invention, a reference to the template corresponding to each symbol and the position of each symbol in two dimensions must be encoded. The representation of the template references and the symbol positions is preferably compressed.

The amount of compression will depend on the initial encoding of the template references and the symbol positions. The ideal encoding situation for the case where most of the symbols are characters from a text is one where the symbol information is ordered in reading order, that is, the order in which a person would read the characters. This is because the characters and their positions, when viewed from this perspective, have the least entropy. For instance, the characters display redundancy due to the rules of spelling of the language, due to their positions, due to the standards for aligning characters on a line, due to kerning, and so forth.

In preferred embodiments, therefore, an approximation of the reading order of the characters is reconstructed. Unlike in optical character recognition systems, this task must be handled fully automatically, and in a way that makes a minimum number of assumptions about the image. For instance, it should not be assumed that the binary image represents text in English, or even that the Roman alphabet is used. On the other hand, perfect operation is not required, since small errors only affect the compression ratio, not the faithfulness of the reconstruction.

Reconstructing reading order is not a simple task for cases in which the original binary image representation was obtained by scanning an original which may be skewed (the typical situation in facsimile systems). One solution to reconstructing reading order involves tracking the lines in the text. The method described here involves a two-step process. First, all characters in a line are located. Second, the characters are sorted by column position to place them in correct reading order.

The first step works as follows. A first character on the page is found by "scanning" the stored representation of the binary image from top-to-bottom, left-to-right. This character may or may not be the first character in a line. The image is then scanned backward character by character to find characters ostensibly on the same line as the first character, ultimately ending at the leftmost character of a line. The image is then scanned forward again, and all characters on the line are collected. The scanning steps must be carefully designed, so as not to be fooled by characters on other lines that appear horizontally aligned because of skew in the text lines of the image. FIG. 11 provides an example of how skew in the text lines of an image can make characters appear as if they are on the same line when they are not. In addition, characters composed of two symbols, such as "i", "j", ":", and "%" should be grouped together on one line.

The preferred method of scanning starting from a current character works by looking to the left or right for a character having at least one run within a horizontal "beam". The beam used to scan for characters is illustrated in the example shown in FIG. 12. Note that in this example, the beam found the dot over the "i". The height of the beam is preferably initially the height of the first character located in the scanning process. It is widened whenever a taller character is scanned, so as to include the entire height of the taller character. When a shorter character is scanned, however, the beam is not shrunk to the new character's height, but preferably to a height computed by taking a weighted running average of the heights of the last several characters. This may be approximated, for example, by computing the new beam height as a sum of $(n-1)/n$ times the old beam height and $1/n$ times the height of the next character, where n is a parameter specifying the aggressiveness of the decay. If several characters fall within the beam, all are added to the current line. (They will be sorted into the correct order in a later step in which the characters are sorted by horizontal position.)

In order to prevent material from other lines from being inadvertently associated with the material from the current line, the beam is preferably limited in horizontal and vertical extent. It is never allowed to grow to a height greater than a certain number of pixels. Furthermore, characters horizontally farther than a certain number of pixels are preferably not included in the scan.

When all of the characters in a given line are found, they are sorted by horizontal position to approximate reading order, and their template code and positions are encoded in that order.

The regularity of positioning of text on a page is a potential source of further compression, in that the position of a character is quite predictable from the position of the previous character. In most cases, it will be vertically aligned at the bottom and separated from the previous character by a standard inter-character spacing. In some cases, because of kerning, for instance, or because the character is the dot over the "preceding" "i", or because the character is the first in a line, the inter-character spacing will vary. Nevertheless, the generally regular character spacing can be exploited by encoding not the absolute x and y positions of the characters but their offsets from the previous character, for example, the displacement from the lower right corner of the previous character to the lower left corner of the current character. Furthermore, the first two sources of variance—kerning and multi-symbol characters—can be handled by using as the default inter-character space the space between the last consecutive occurrences of the current characters (if they have occurred previously), or by encoding the most frequent value of the inter-character space for the pair (the mode value) and using the difference from the mode as the representation of the inter-character space. Finally, the number of times that this default inter-character space can be used can be maximized by allowing near misses to be treated as hits. One way to achieve this is to perform the check at a reduced resolution. Of course, the error may propagate. If this is unacceptable, the near miss must cause the encoded position of the character to differ from the true position by only a small amount; a single pixel is appropriate.

The sequence of template codes can be further compressed due to variation in the frequency of occurrence of the various templates by Huffman coding, or, to exploit regularities in spelling, by Lempel-Ziv compression or similar methods. The symbol position information can also be further compressed by such methods.

In fact, the template code or symbol position information can even be indicated in the compressed representation implicitly, rather than by explicit indexing into the template library and into coordinate positions, respectively. For example, the positions of characters matching each template can be given immediately following the template representation itself, thereby obviating the need for an explicit representation of template codes for those symbols as the associated template is indicated implicitly.

In summary, through the above methods, typically four streams of information are generated: a sequence of templates representations, a sequence of template references corresponding to the symbols (approximately in reading order if the binary image is primarily text), a sequence of the row positions of the symbols, and a sequence of the column positions of the symbols. These streams in themselves constitute a significantly compressed representation of the binary image. However, each of these streams can be further compressed by the disclosed techniques.

The method has been shown to achieve, for example, a compression ratio greater than 25 times that produced by CCITT-3 for an 8-page 300 DPI document. Each page is thus compressed from a megabyte of raw image to 4 kilobytes by the method of the invention. It is important to note that since pages of a document are not treated separately, the compression ratio will increase with the length of the document.

In some embodiments, it may be desirable to store or transmit the compressed image at a lower resolution than the starting image. For example, one may want to store or transmit a 300 DPI document at 100 DPI. This can be accomplished by further compressing the template representations by skipping pixels or in any way reducing the number of pixels by a real or integer divisor. At decompression, interpolation can be used to recreate the templates. Of course, some quality will be lost, but in many applications, the increase in compression achieved is an overriding factor. It is preferable that such reduction in resolution is not performed at an earlier stage in the compression process. This is because high resolution aids the symbol matching process. Therefore, images should be scanned, and symbols should be identified and matched, at high resolution, and any reducing of the resolution should be performed only after the template library is established.

Compression of Non-binary Images

Although the preferred embodiment is described in terms of compression of binary images having pixels spatially distributed into rows and columns, the invention is applicable to non-binary images with different spatial distributions as well. For example, grey-scale or color images might be compressed by classifying the pixels into a first type representing text and graphics and a second type representing background, applying the compression method to the patterns of pixels of the first type, and compressing the background using a different method. In this way, text documents may be compressed even if printed on a non-white background, while retaining the background information. Furthermore, the decision as to whether a pixel is of the first or second type might not be based on its grey-scale value alone, but also on context or other information. Finally, grey-scale information might be used to distinguish text from graphics and background so that the text can be compressed by the methods of this invention while the grey-scale graphics are separately compressed with possible half-toning, dithering, or other preliminary processing. (Certain of these possibilities hold for binary black-and-white images as well.)

Another method of use with non-binary images involves classifying pixels into symbols of like color, matching them based on shape alone, and storing for each symbol an indication of its associated template and its color.

Another method of use with non-binary images involves separating the image into bit planes and compressing some or all of these bit planes using the methods of the invention. Insofar as there is a corrolation between certain of the bit planes and dominant symbol-based patterns, this method can compress the images better than non-symbol-matching methods.

The methods of the invention can be used to generate non-binary images as well, even from binary originals, for example, by maintaining the templates as grey-scale images obtained by averaging, rather than voting, on the value of each pixel. This allows an anti-aliased representation of each symbol to be automatically developed, which would be especially useful in the invention's application as an image enhancement method.

The image need not be restricted to structuring in terms of evenly-spaced rows and columns. For instance, the scanning process might have differing resolution in the x and y directions (as in standard facsimile images, which are scanned at 200 by 100 pixels, thereby leading to rectangular, rather than square pixels). Other arrangements of pixels, based on arbitrary fixed or random plane tessellations are possible.

It is recognized that variations and modifications of the invention will occur to those skilled in the art, and it is intended that all such variations and modifications be included within the scope of the appended claims. For example, applications of the method to compressing portions of images, either contiguous or non-contiguous, rather than entire images, or to subsets of identified symbols, the subsets distinguished by function (as, for example, only textual identified symbols rather than graphical identified symbols), size, shape, position, or other features, are included within the scope of the invention.

What is claimed is:

1. A method for compressing images comprising:
   precompressing a first representation of an image, said first representation based on pixels of a first type and a second type, to generate a precompressed representation of said image,
   identifying symbols in said precompressed representation of said image,
   comparing a plurality of identified symbols to each of at least one template from a library of templates to match identified symbols to templates, and
   generating a compressed representation of said image including a representation of templates, and an indication of a location and a template for symbols in said image.

2. The method of claim 1 wherein said first representation of an image is precompressed by rim-length encoding.

3. The method of claim 2 wherein said first representation is based on rows and columns of pixels, and symbols are identified by associating runs of said first type of pixel in adjacent rows of said precompressed representation which have at least one pixel of said first type in the same column or in the same or adjacent columns.

4. A method for compressing images comprising:
   identifying symbols in a first representation of an image,
   comparing a plurality of identified symbols to each of at least one template from a library of templates to match identified symbols to templates, wherein said library is augmented during image compression by storing in said library symbols for which no matching template is found as new templates, and wherein each template is defined by a representation determined by a plurality of the symbols which match, wherein each template is defined by a unique spatial distribution of pixels, said distribution determined by the distributions of pixels of a plurality of the symbols which match said template, and
   generating a compressed representation of said image including a representation of templates, and an indication of a location and a template for symbols in said image.

5. The method of claim 4 wherein the distribution of pixels defining a template is determined by averaging the distributions of pixels of a plurality of the symbols which match said template.

6. The method of claim 4 wherein the distribution of pixels defining a template is determined by taking one symbol matching the template and changing a pixel in that symbol only if more than a predetermined fraction of the other symbols matching the template disagree with that pixel.

7. A method for compressing images comprising:
   identifying symbols in a first representation of an image,
   comparing a plurality of identified symbols to each of at least one template in a library of templates to match identified symbols to templates, said comparing step including identifying error locations, performing at least one test on said error locations and on other global features of the symbol and the template, and declaring a match between a symbol and a template only if all of the tests in at least one of a set of predetermined groups of tests are passed, and
   generating a compressed representation of said image including a representation of templates, and an indication of a location and a template for symbols in said image.

8. The method of claim 7 wherein said first representation is based on rows and columns of pixels of a first type and a second type, said comparing step including identifying error pixel locations which have a pixel of said first type in only said symbol or said template, but not both, and performing at least one test on said error pixel locations and other global features of the symbol and the template, a match between a symbol and a template being declared only if all of the tests in at least one of a set of predetermined groups of tests are passed.

9. The method of claim 8 wherein said error locations are run-length encoded.

10. The method of claim 8 wherein one of said at least one test is passed if the distance between each error pixel location and the nearest pixel of the first type in the template or symbol having a pixel of the second type at the error pixel location is less than a predetermined value.

11. The method of claim 8 wherein one of said at least one test is passed if the distance between each error pixel location and the nearest pixel of the second type in the template or symbol having a pixel of the first type at the error pixel location is less than a predetermined value.

12. The method of claim 8 wherein one of said at least one test depends on the sizes, shapes, and orientations of contiguous groups of error pixels in some error map.

13. The method of claim 12 wherein one of said at least one test is passed if all contiguous groups of error pixel locations are smaller than predetermined patterns of pixels.

14. The method of claim 7 wherein one of said at least one test is passed if inferred shifts of the symbol relative to the template are consistent.

15. The method of claim 14 wherein shifts are inferred from the sizes, shapes, and orientations of contiguous groups of error pixel locations and their relation to adjacent pixels.

16. The method of claim 15 wherein shifts are inferred from triangles of pixels in the template and symbol error maps such that the inferred shift is towards or away from the fourth pixel in the square bounding the triangle depending on whether said fourth pixel has the same or different parity, respectively, as the triangle pixels in the template.

17. The method of claim 8 wherein one of said at least one test is passed if the difference in heights between a template and a symbol is less than a predetermined value.

18. The method of claim 8 wherein one of said at least one test is passed if the difference in widths between a template and a symbol is less than a predetermined value.

19. The method of claim 8 wherein one of said at least one test is passed if the ratio of the number of pixels of the first type in the symbol and the number of pixels of the first type in the template is within a redetermined range.

20. The method of claim 8 wherein one of said at least one test is passed if the ratio of the number of error pixel locations to the number of pixels of the first type in said template or said symbol, or the minimum or maximum of the two, is less than a predetermined value.

21. The method of claim 8 wherein one of said at least one test is passed if the ratio of the number of error pixel locations to the number of pixels of the first type adjacent to a pixel of said second type in said template or said symbol, or the minimum or maximum of the two, is less than a predetermined value.

22. The method of claims 7 or 8 wherein at least one of said at least one test depends on symbol size.

23. A method for compressing images comprising:
identifying symbols in a first representation of an image,
comparing a plurality of identified symbols to each of at least one template in a library of templates to match identified symbols to templates, wherein each said template is defined by a representation based on a spatial distribution of pixels of a first type, and
generating a compressed representation of said image including a representation of templates, and an indication of a location and a template for symbols in said image, wherein the representation of a plurality of said templates is a representation of the boundary of the spatial distribution of pixels of the first type for the templates.

24. A method for compressing images comprising:
identifying symbols in a first representation of an image,
comparing a plurality of identified symbols to each of at least one template in a library of templates to match identified symbols to templates, and
generating a compressed representation of said image including a representation of templates, and an indication of a location and a template for symbols in said image, wherein the representation of a plurality of said templates comprises a reference to a frame template for defining an outer boundary of said template and a list of hole templates with associated positions within said frame template for defining any inner boundaries of said template.

25. The method of claim 24 wherein said frame templates and hole templates are represented by representations of the boundary of said frame templates and hole templates.

26. A method for compressing images comprising:
identifying symbols in a first representation of an image,
comparing a plurality of identified symbols to each of at least one template in a library of templates to match identified symbols to templates, wherein the templates are indexed in said library according to template features, and wherein said step of comparing proceeds according to the index, whereby those templates more likely, based on features, to match a symbol are compared to the symbol before templates less likely to match, and those templates whose indexed features indicate that the likelihood of a match falls below a predetermined threshold are not compared, and
generating a compressed representation of said image including a representation of templates, and an indication of a location and a template for symbols in said image.

27. The method of claims 1, 2, or 3 wherein each template is defined by a unique spatial distribution of pixels, said distribution determined by the distributions of pixels of a plurality of the symbols which match said template.

28. The method of claim 4 wherein said comparing step includes identifying error locations, performing at least one test on said error locations and on other global features of the symbol and the template, and declaring a match between a symbol and a template only if all of the tests in at least one of a set of predetermined groups of tests are passed.

29. The method of claims 1, 2, or 3 wherein said comparing step includes identifying error pixel locations which have a pixel of said first type in only said symbol or said template, but not both, and performing at least one test on said error pixel locations and on other global features of the symbol and the template, a match between a symbol and a template being declared only if all of the tests in at least one of a set of predetermined groups of tests are passed.

30. The method of claims 1, 2, 3, 4, 7 or 8 wherein said first representation is based on pixels of a first type and a second type, and the representation of a plurality of said templates is a representation of the boundary of the spatial distribution of pixels of the first type for the template.

31. The method of claims 1, 2, 3, 4, 7 or 8 wherein the representation of each said template comprises a reference to a frame template for defining an outer boundary of said template and a list of hole templates with associated positions within said frame template for defining any inner boundaries of said template.

32. The method of claims 1, 2, 3, 4, 7, 8, 23 or 24 wherein the templates are indexed in said library according to template features, and wherein said step of comparing proceeds according to the index, whereby those templates more likely, based on features, to match a symbol are compared to the symbol before templates less likely to match, and those templates whose indexed features indicate that the likelihood of a match falls below a predetermined threshold are not compared.

33. The method of claims 1, 2, 3, 4, 7, 8, 23, 24, or 26 further comprising reducing the resolution of the representation of a plurality of templates.

34. The method of any of claims 1, 2, 3, 4, 7, 8, 23, 24 or 26 wherein said compressed representation of said image includes a plurality of data streams, and wherein at least one of said streams is further compressed.

35. The method of any of claims 1, 2, 3, 4, 7, 8, 23, 24 or 26 wherein said compressed representation of said image includes a template stream, a template reference stream, and row and column position streams, and wherein at least one of said streams is further compressed.

36. The method of any of claims 1, 2, 3, 4, 7, 8, 23, 24 or 26 further comprising splitting templates comprising a region smaller than a predetermined pattern of pixels into more than one template.

37. The method of claim 36 further comprising comparing templates formed by splits to other templates and merging templates formed by splits which match another template with that template.

38. The method of any of claims 1, 2, 3, 4, 7, 8, 25, 24 or 26 further comprising eliminating symbols smaller than predetermined patterns of pixels.

39. The method of any of claims 1, 2, 3, 4, 7, 8, 23, 24 or 26 wherein the indications of locations for symbols in said image are represented by the difference between the actual offset between a given symbol and a preceding symbol and a standard offset for the symbol pair defined by said given symbol and preceding symbol.

40. The method of claim 39 wherein said standard offset is the offset last seen for the symbol pair.

41. The method of claim 39 wherein said standard offset is the most frequently seen offset for the symbol pair.

42. The method of claim 39 wherein the difference between the standard offset and the actual offset is determined at a lower resolution than the resolution of the first representation of said image.

43. The method of any of claims 1, 2, 3, 4, 7, 8, 23, 24 or 26 further comprising determining approximate reading order of said symbols and generating said compressed representation of said image according to said reading order.

44. The method of claim 43 wherein said reading order is determined by locating symbols on a single line and sorting the symbols.

45. The method of claim 44 wherein the symbols on a line are determined by using a beam to search along the line, the size of said beam varying according to the size of one or more adjacent symbols.

46. The method of claim 45 wherein bounds on the size of the beam are imposed.

47. The method of any of claims 1, 2, 3, 4, 7, 8, 23, 24 or 26 applied to an image transmission system.

48. The method of any of claims 1, 2, 3, 4, 7, 8, 23, 24 or 26 applied to a facsimile transmission system.

49. The method of any of claims 1, 2, 3, 4, 7, 8, 23, 24 or 26 applied to an image enhancement system.

50. The method of any of claims 1, 2, 3, 4, 7, 8, 23, 24 or 26 applied to an image storage system.

51. Apparatus for compressing images comprising:
input means for accepting a first representation of an image, and
processing means for
a) precompressing said first representation of said image to generate a precompressed representation of said image,
b) identifying symbols in said precompressed representation of said image,
c) comparing a plurality of identified symbols to each of at least one template from a library of templates to match identified symbols to templates, and
d) generating a compressed representation of said image including a representation of templates, and an indication of a location and a template corresponding to symbols in said image.

52. Apparatus for compressing images comprising:
input means for accepting a, first representation of an image, and
processing means for
a) identifying symbols in said first representation of said image,
b) comparing a plurality of identified symbols to each of at least one template from a library of templates to match identified symbols to templates, wherein said library is augmented during image compression by storing in said library symbols for which no matching template is found as new templates, and wherein each template is defined by representations determined by a plurality of the symbols which match, wherein each template is defined by a unique spatial distribution of pixels, said distribution determined by the distributions of pixels of a plurality of the symbols which match said template, and
c) generating a compressed representation of said image including a representation of templates, and an indication of a location and a template corresponding to symbols in said image.

53. Apparatus for compressing images comprising:
input means for accepting a first representation of an image, and
processing means for
a) identifying symbols in said first presentation of said image,
b) comparing a plurality of identified symbols to each of at least one template from a library of templates to match identified symbols to templates, said comparing step including identifying error locations, performing at least one test on said error locations and on other global features of the symbol and the template, and declaring a match between a symbol and a template only if all of the tests in at least one of a set of predetermined groups of tests are passed, and
c) generating a compressed representation of said image including a representation of templates, and an indication of a location and a template corresponding to symbols in said image.

54. Apparatus for compressing images comprising:
input means for accepting a first representation of an image, and
processing means for
a) identifying symbols in said first representation of said image,
b) comparing a plurality of identified symbols to each of at least one template from a library of templates to match identified symbols to templates, wherein each said template is defined by a representation based on a spatial distribution of pixels of a first type, and c) generating a compressed representation of said image including a representation of templates, and an indication of a location and a template corresponding to symbols in said image, wherein the representation of a plurality of said templates is a representation of the boundary of the spatial distribution of pixels of the first type for the templates.

55. Apparatus for compressing images comprising:
input means for accepting a first representation of an image, and processing means for
a) identifying symbols in said first representation of said image,
b) comparing a plurality of identified symbols to each of at least one template from a library of templates to match identified symbols to templates, and
c) generating a compressed representation of said image including a representation of templates, and an indication of a location and a template corresponding to symbols in said image, wherein the representations of a plurality of said templates comprise a reference to a frame template for defining an outer boundary of the template and a list of hole templates with associated positions within said frame template for defining any inner boundaries of said template.

56. Apparatus for compressing images comprising:
input means for accepting a first representation of an image, and processing means for
a) identifying symbols in said first representation of said image,
b) comparing a plurality of identified symbols to each of at least one template from a library of templates to match identified symbols to templates, wherein the templates are indexed in said library according to template features, and wherein said step of comparing proceeds according to the index, whereby those templates more likely, based on features, to match a symbol are compared to the symbol before templates less likely to match, and those templates whose indexed features would preclude a match are not compared, and
c) generating a compressed representation of said image including a representation of templates, and an indication of a location and a template corresponding to symbols in said image.

57. The apparatus as in any of claims 51-56 further comprising output means for providing said compressed representation of said image.

58. The apparatus as in any of claims 51-56 wherein said input means is a scanner.

59. The apparatus of claim 55 wherein said output means is a modem.

60. A method for compressing images comprising:
precompressing a first representation of an image, said first representation based on pixels of a first type and a second type, to generate a precompressed representation of said image,
identifying symbols in said precompressed representation of said image,
comparing a plurality of identified symbols to each of at least one template from a library of templates to match identified symbols to templates, and
generating a compressed representation of said image including an indication of a location and a template for symbols in said image.

61. The method of claim 60 wherein said first representation of an image is precompressed by run-length encoding.

62. The method of claim 61 wherein said first representation is based on rows and columns of pixels, and symbols are identified by associating runs of said first type of pixel in adjacent rows of said precompressed representation which have at least one pixel of said first type in the same column or in the same or adjacent columns.

63. A method for compressing images comprising:
identifying symbols in a first representation of an image,
comparing a plurality of identified symbols to each of at least one template in a library of templates to match identified symbols to templates, said comparing step including identifying error locations, performing at least one test on said error locations and on other global features of the symbol and the template, and declaring a match between a symbol and a template only if all of the tests in at least one of a set of predetermined groups of tests are passed, and
generating a compressed representation of said image including an indication of a location and a template for symbols in said image.

64. The method of claim 63 wherein said first representation is based on rows and columns of pixels of a first type and a second type, said comparing step including identifying error pixel locations which have a pixel of said first type in only said symbol or said template, but not both, and performing at least one test on said error pixel locations and other global features of the symbol and the template, a match between a symbol and a template being declared only if all of the tests in at least one of a set of predetermined groups of tests are passed.

65. The method of claim 64 wherein said error locations are run-length encoded.

66. The method of claim 64 wherein one of said at least one test is passed if the distance between each error pixel location and the nearest pixel of the first type in the template or symbol having a pixel of the second type at the error pixel location is less than a predetermined value.

67. The method of claim 64 wherein one of said at least one test is passed if the distance between each error pixel location and the nearest pixel of the second type in the template or symbol having a pixel of the first type at the error pixel location is less than a predetermined value.

68. The method of claim 64 wherein one of said at least one test depends on the sizes, shapes, and orientations of contiguous groups of error pixels in some error map.

69. The method of claim 68 wherein one of said at least one test is passed if all contiguous groups of error pixel locations are smaller than predetermined patterns of pixels.

70. The method of claim 68 wherein one of said at least one test is passed if inferred shifts of the symbol relative to the template are consistent.

71. The method of claim 70 wherein shifts are inferred from the sizes, shapes, and orientations of contiguous groups of error pixel locations and their relation to adjacent pixels.

72. The method of claim 71 wherein shifts are inferred from triangles of pixels in the template and symbol error maps such that the inferred shift is towards or away from the fourth pixel in the square bounding the triangle depending on whether said fourth pixel has the same or different parity, respectively, as the triangle pixels in the template.

73. The method of claim 64 wherein one of said at least one test is passed if the difference in heights between a template and a symbol is less than a predetermined value.

74. The method of claim 64 wherein one of said at least one test is passed if the difference in widths between a template and a symbol is less than a predetermined value.

75. The method of claim 64 wherein one of said at least one test is passed if the ratio of the number of pixels of the first type in the symbol and the number of pixels of the first type in the template is within a predetermined range.

76. The method of claim 64 wherein one of said at least one test is passed if the ratio of the number of error pixel locations to the number of pixels of the first type in said template or said symbol, or the minimum or maximum of the two, is less than a predetermined value.

77. The method of claim 64 wherein one of said at least one test is passed if the ratio of the number of error pixel locations to the number of pixels of the first type adjacent to a pixel of said second type in said template or said symbol, or the minimum or maximum of the two, is less than a predetermined value.

78. The method of claims 63 or 64 wherein at least one of said at least one test depends on symbol size.

79. A method for compressing images comprising:
identifying symbols in a first representation of an image,
comparing a plurality of identified symbols to each of at least one template in a library of templates to match identified symbols to templates, wherein the templates are indexed in said library according to template features, and wherein said step of comparing proceeds according to the index, whereby those templates more likely, based on features, to match a symbol are compared to the symbol before templates less likely to match, and those templates whose indexed features indicate that the likelihood of a match falls below a predetermined threshold are not compared, and
generating a compressed representation of said image including an indication of a location and a template for symbols in said image.

80. A method for compressing images comprising:
identifying symbols in a first representation of an image, said first representation based on rows and columns of pixels of a first type and a second type,
comparing a plurality of identified symbols to each of at least one template in a library of templates to match identified symbols to templates, said comparing step including identifying error pixel locations which have a pixel of said first type in only said symbol or said template, but not both, and performing at least one test on said error pixel locations, wherein one of said at least one test is passed if the distance between each error pixel location and the nearest pixel of the first type in the template or symbol having a pixel of the second type at the error pixel location is less than a predetermined value, and
generating a compressed representation of said image including a representation of templates, and an indication of a location and a template for symbols in said image.

81. A method for compressing images comprising:
identifying symbols in a first representation of an image, said first representation based on rows and columns of pixels of a first type and a second type,
comparing a plurality of identified symbols to each of at least one template in a library of templates to match identified symbols to templates, said comparing step including identifying error pixel locations which have a pixel of said first type in only said symbol or said template, but not both, and performing at least one test on said error pixel locations, wherein one of said at least one test is passed if the distance between each error pixel location and the nearest pixel of the second type in the template or symbol having a pixel of the first type at the error pixel location is less than a predetermined value, and
generating a compressed representation of said image including a representation of templates, and an indication of a location and a template for symbols in said image.

82. A method for compressing images comprising:
identifying symbols in a first representation of an image, said first representation based on rows and columns of pixels of a first type and a second type,
comparing a plurality of identified symbols to each of at least one template in a library of templates to match identified symbols to templates, said comparing step including identifying error pixel locations which have a pixel of said first type in only said symbol or said template, but not both, and performing at least one test on said error pixel locations, wherein one of said at least one test depends on the sizes, shapes and orientations of contiguous groups of error pixel locations in some error map other than an error map consisting of all error pixel locations, and
generating a compressed representation of said image including a representation of templates, and an indication of a location and a template for symbols in said image.

83. The method of claim 82 wherein one of said at least one test is passed if all of said contiguous groups of error pixel locations are smaller than predetermined patterns of pixels.

84. A method for compressing images comprising:
identifying symbols in a first representation of an image, said first representation based on rows and columns of pixels of a first type and a second type,
comparing a plurality of identified symbols to each of at least one template in a library of templates to match identified symbols to templates, said comparing step including identifying error pixel locations which have a pixel of said first type in only said symbol or said template, but not both, and performing at least one test on said error pixel locations, wherein one of said at least one test is passed if inferred shifts of the symbol relative to the template are consistent, and
generating a compressed representation of said image including a representation of templates, and an indication of a location and a template for symbols in said image.

85. The method of claim 84 wherein shifts are inferred from the sizes, shapes, and orientations of contiguous groups of error pixel locations and their relation to adjacent pixels.

86. The method of claim 85 wherein shifts are inferred from triangles of pixels in the template and symbol error maps such that the inferred shift is towards or away from the fourth pixel in the square bounding the triangle depending on whether said fourth pixel has the same or different parity, respectively, as the triangle pixels in the template.

87. The method of claim 85 wherein shifts are inferred from single error pixels such that the inferred shift is towards or away from some pixel adjacent to said single error pixel depending on whether said adjacent pixel has the same or different parity, respectively, as said error pixel in the template.

88. A method for compressing images comprising:
identifying symbols in a first representation of an image, said first representation based on rows and columns of pixels of a first type and a second type,
comparing a plurality of identified symbols to each of at least one template in a library of templates to match identified symbols to templates, said comparing step including identifying error pixel locations which have a pixel of said first type in only said symbol or said template, but not both, and performing at least one test on said error pixel locations, wherein one of said at least one test is passed if the difference in width between the template and the symbol is less than a predetermined value, and
generating a compressed representation of said image including a representation of templates, and an indication of a location and a template for symbols in said image.

89. A method for compressing images comprising:
identifying symbols in a first representation of an image, said first representation based on rows and columns of pixels of a first type and a second type,
comparing a plurality of identified symbols to each of at least one template in a library of templates to match identified symbols to templates, said comparing step including identifying error pixel locations which have a pixel of said first type in only said symbol or said template, but not both, and performing at least one test on said error pixel locations, wherein one of said at least one test is passed if the difference in height between the template and the symbol is less than a predetermined value, and
generating a compressed representation of said image including a representation of templates, and an indication of a location and a template for symbols in said image.

90. A method for compressing images comprising:
identifying symbols in a first representation of an image, said first representation based on rows and columns of pixels of a first type and a second type,
comparing a plurality of identified symbols to each of at least one template in a library of templates to match identified symbols to templates, said comparing step including identifying error pixel locations which have a pixel of said first type in only said symbol or said template but not both, and performing at least one test on said error pixel locations, wherein one of said at least one test is passed if the ratio of the number of pixels of the first type in the symbol and the number of pixels of the first type in the template is within a predetermined range, and
generating a compressed representation of said image including a representation of templates, and an indication of a location and a template for symbols in said image.

91. A method for compressing images comprising:
identifying symbols in a first representation of an image, said first representation based on rows and columns of pixels of a first type and a second type,
comparing a plurality of identified symbols to each of at least one template in a library of templates to match identified symbols to templates, said comparing step including identifying error pixel locations which have a pixel of said first type in only said symbol or said template, but not both, and performing at least one test on said error pixel locations, wherein one of said at least one test is passed if the ratio of the number of error pixel locations to the number of pixels of the first type in said template or said symbol, or the minimum or maximum of the two, is less than a predetermined value, and
generating a compressed representation of said image including a representation of templates, and an indication of a location and a template for symbols in said image.

92. A method for compressing images comprising:
identifying symbols in a first representation of an image, said first representation based on rows and columns of pixels of a first type and a second type,
comparing a plurality of identified symbols to each of at least one template in a library of templates to match identified symbols to templates, said comparing step including identifying error pixel locations which have a pixel of said first type in only said symbol or said template but not both, and performing at least one test on said error pixel locations, wherein one of said at least one test is passed if the ratio of the number of error pixel locations to the number of pixels of the first type adjacent to a pixel of said second type in said template or said symbol, or the minimum or maximum of the two, is less than a predetermined value, and
generating a compressed representation of said image including a representation of templates, and an indication of a location and a template for symbols in said image.

* * * * *

UNITED STATES PATENT AND TRADEMARK OFFICE
CERTIFICATE OF CORRECTION

PATENT NO. : 5,303,313

DATED : April 12, 1994

INVENTOR(S) : Peter B. Mark and Stuart M. Shieber

It is certified that error appears in the above-indentified patent and that said Letters Patent is hereby corrected as shown below:

Column 7, line 61: please delete "adaptible" and insert therefor -- adaptable --;

Column 8, line 28: after "image" delete "s" and insert -- is --;

Column 13, line 47: delete "per-formed" and insert therefor -- performed --; and Column 17, line 55: delete "rim-length" and insert therefor --run-length--.

Signed and Sealed this

Fourth Day of October, 1994

Attest:

BRUCE LEHMAN

*Attesting Officer*  *Commissioner of Patents and Trademarks*